US010864961B2

(12) United States Patent
Cotter

(10) Patent No.: US 10,864,961 B2
(45) Date of Patent: *Dec. 15, 2020

(54) STEERING MECHANISM FOR VEHICLE

(71) Applicant: Sun MicroMobility, LLC, Phoenix, AZ (US)

(72) Inventor: Robert M. Cotter, Raleigh, NC (US)

(73) Assignee: Sun MicroMobility, LLC, Phoenix, AZ (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/023,905

(22) Filed: Jun. 29, 2018

(65) Prior Publication Data

US 2018/0304955 A1    Oct. 25, 2018

Related U.S. Application Data

(63) Continuation of application No. 14/775,912, filed as application No. PCT/US2014/024300 on Mar. 12, 2014, now Pat. No. 10,011,317.

(60) Provisional application No. 61/779,701, filed on Mar. 13, 2013.

(51) Int. Cl.
*B62K 21/02*    (2006.01)
*B62K 5/08*    (2006.01)

(52) U.S. Cl.
CPC ............ *B62K 21/02* (2013.01); *B62K 5/08* (2013.01)

(58) Field of Classification Search
CPC . B62K 3/005; B62K 5/08; B62K 9/02; B62K 21/00; B62K 21/02; B62K 23/02
See application file for complete search history.

(56) References Cited

U.S. PATENT DOCUMENTS

| | | | | |
|---|---|---|---|---|
| 1,599,223 A * | 9/1926 | Epps | ........................ | B62K 9/02 280/269 |
| 1,777,781 A * | 10/1930 | Biagi | ........................ | B62K 9/00 280/1.12 |
| 3,561,778 A * | 2/1971 | La Brie | ..................... | B62K 5/05 280/7.14 |
| 4,070,032 A * | 1/1978 | Cunningham | ........... | B62K 3/12 280/202 |
| 4,072,325 A * | 2/1978 | Bright | .................... | B62D 37/04 280/267 |
| 4,351,410 A * | 9/1982 | Townsend | ................. | B62D 9/02 180/210 |
| 4,717,164 A * | 1/1988 | Levavi | .................... | B60G 17/00 180/210 |
| 4,740,004 A * | 4/1988 | McMullen | ............... | B62K 5/05 280/124.103 |

(Continued)

*Primary Examiner* — Tony H Winner
*Assistant Examiner* — Michael R Stabley
(74) *Attorney, Agent, or Firm* — NK Patent Law

(57) ABSTRACT

The present invention relates to a steering assembly for a vehicle, comprising two rotatable rods, oriented vertically and having a wheel attachment on one end wherein wheels can be rotatably secured. The rods are connected to a first cross bar in such a way that enables the steering assembly to be attached to the vehicle frame and allows the rods to rotate. The rods are also rotatably attached to a second cross bar on the opposite end of the rod in such a way as to allow the rods to rotate. The rods are also attached to a steering mechanism in a manner that enables them to be manually rotated in unison and which in turn pivots the wheels and steers the vehicle.

19 Claims, 5 Drawing Sheets

(56) References Cited

U.S. PATENT DOCUMENTS

| | | | | |
|---|---|---|---|---|
| 5,145,196 | A | * | 9/1992 | Langkamp ............. A61G 5/023 280/278 |
| 6,161,860 | A | * | 12/2000 | Corneau ................. A61H 3/04 135/67 |
| 6,367,824 | B1 | * | 4/2002 | Hayashi .................. B62K 5/05 280/124.103 |
| 6,817,617 | B2 | * | 11/2004 | Hayashi .................. B62K 5/05 280/124.1 |
| 6,953,203 | B2 | * | 10/2005 | Wilcox ................. B62K 3/005 280/282 |
| 7,708,291 | B1 | * | 5/2010 | Henderson ............... B62D 9/02 280/124.103 |
| 7,731,210 | B2 | * | 6/2010 | Pedersen ............. B60G 21/007 180/209 |
| 8,016,302 | B1 | * | 9/2011 | Reeve ...................... B62K 5/05 280/124.103 |
| 8,419,027 | B2 | * | 4/2013 | Ting ....................... B62K 21/18 280/93.511 |
| 2006/0226628 | A1 | * | 10/2006 | Lindsay ................. A61G 5/023 280/250 |

* cited by examiner

STEERING MECHANISM FOR VEHICLE

INCORPORATION BY REFERENCE TO RELATED APPLICATIONS

This application is a continuation of U.S. application Ser. No. 14/775,912 filed Sep. 14, 2015, now U.S. Pat. No. 10,011,317 issued Jul. 3, 2018, which is a National Stage Entry of PCT Application No. PCT/US14/24300 filed Mar. 12, 2014, which claims priority to U.S. Provisional Application. No. 61/779,701 filed Mar. 13, 2013. The disclosures of each of the applications cited in this paragraph are hereby incorporated herein by reference in their entireties.

BACKGROUND

The world today is experiencing some significant changes to the climate, some of it is believed to be caused by to the emission of carbon dioxide by burning fossil fuels. The burning of carbon based fuels coverts carbon to carbon dioxide which leads to increased concentrations of carbon dioxide in the atmosphere which is believed to contribute to climate change. Certainly one of the biggest users of fossil fuels are vehicles used for transportation of people and things. Most of these vehicles are propelled by internal combustion engines which burn fossil fuels. Therefore, any practical reduction in the number of these type of vehicles would possibly mitigate future climate damage.

One of the ways to reduce the use of such vehicles is to increase the use of self-propelled non-carbon dioxide emitting vehicles such as bicycles. However, bicycles have their limitations. Bicycles sometimes can be difficult on the roads when sharing roads with cars and trucks. With the exception of recumbent bicycles, most bicycle seats are not comfortable. In addition, with most bicycles you are exposed to the elements.

A need exists for a non-pollution emitting vehicle that can be both self-propelled and/or propelled by a non-polluting motor.

SUMMARY

The present invention relates generally to a steering assembly for a vehicle, comprising two rods, rotatable and oriented essentially vertically and having a wheel attachment on one end wherein wheels can be rotatably secured. The rods are connected to a first cross bar in such a way that enables the steering assembly to be attached to the vehicle frame and allows the rods to rotate. The rods are also rotatably attached to a second cross bar on the opposite end of the rod in such a way as to allow the rods to rotate. The rods are also attached to a steering mechanism in a manner that enables them to be manually rotated in unison and which in turn pivots the wheels and steers the vehicle.

BRIEF DESCRIPTION OF THE DRAWINGS

Implementation of the invention will become more apparent from the detailed description set forth below when taken in conjunction with the drawings, in which like elements bear like reference numbers.

DETAILED DESCRIPTION OF THE PREFERRED EMBODIMENT

Each of the rods 100A, 100B has a distal and proximal ends and are preferably cylindrical in shape. The rods should preferably be made of light and strong material such as metal, metal composite or plastic. Other materials of equal weight and strength may be suitable as well as certain grades of aluminum. The rods may also be solid or hollow such as a tube.

Each of the rods 100A, 100B has a wheel attachment 101A, 101B on its distal end. The wheel attachments provides a hub for the rotatable attachment of a wheel. Such attachment should be made of strong and light material such as metal wherein wheels can be rotatably secured. The wheels can be bicycle wheels like that found on street pedal road bike.

The first cross bar 103 as referred to herein is positioned between the distal and proximal ends of the rods. The cross bar enables the steering assembly to be attached to the vehicle frame and also allows the rods to rotate about the X axis.

The second cross bar 105 as referred to herein is connected to the proximal end of the rods in such a way as to allow the rods to rotate about the X axis. In addition, the bar is connected to the steering means 104 in such a manner that enables the manual rotation of the two rods in unison about the X axis, which in turn pivots the wheels and steers the vehicle.

Figure 1:
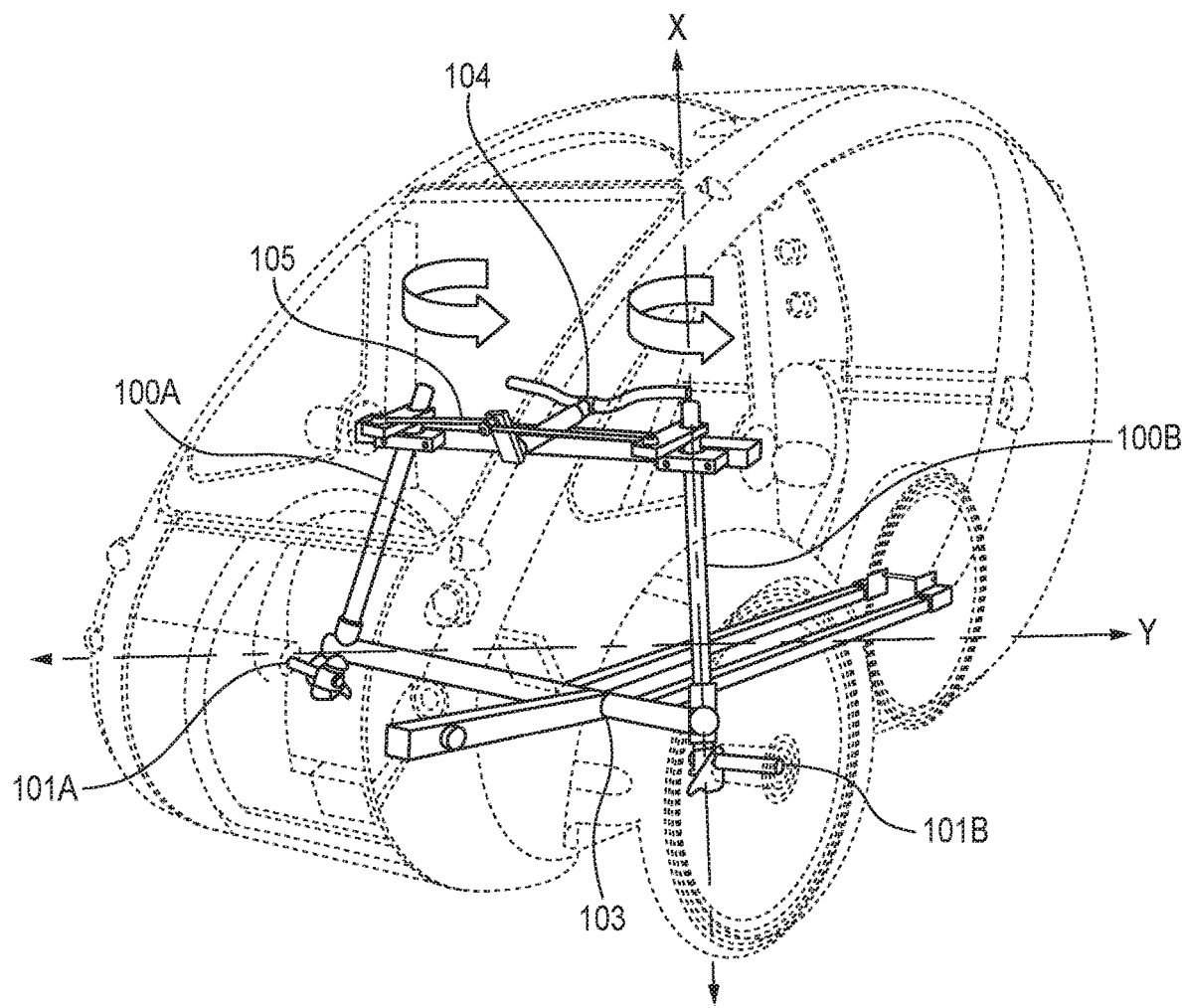
FIG. 1 is an illustration of a steering assembly.
Figure 2:
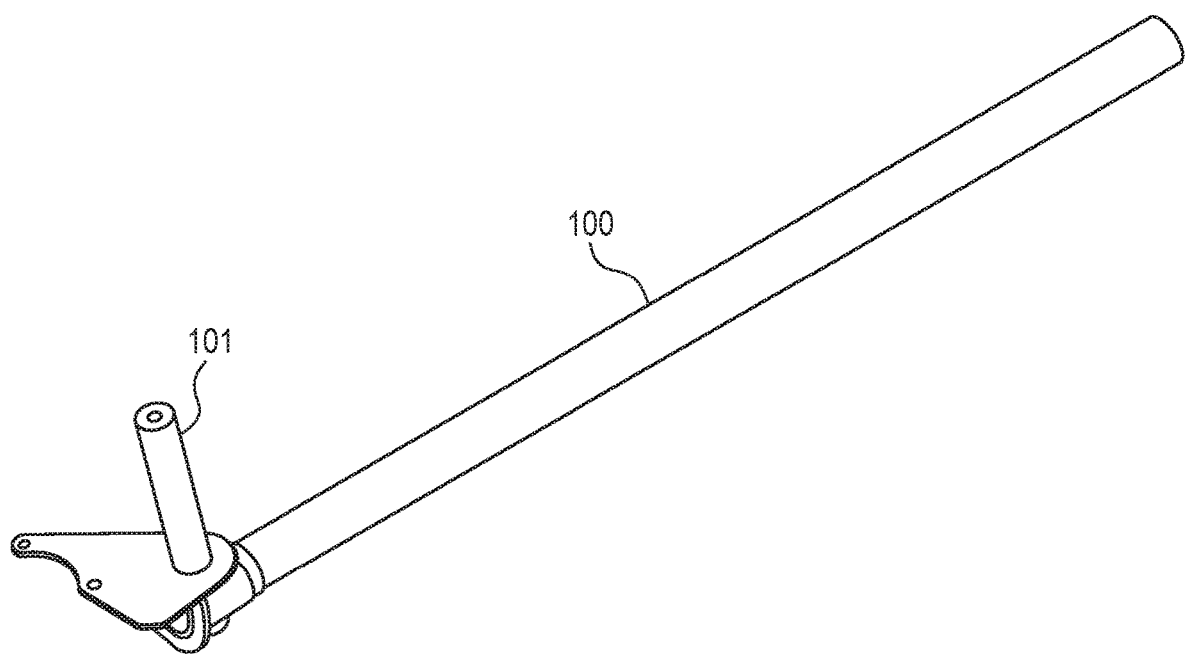
FIG. 2 is an illustration of a rod and a wheel attachment.
Figure 3:
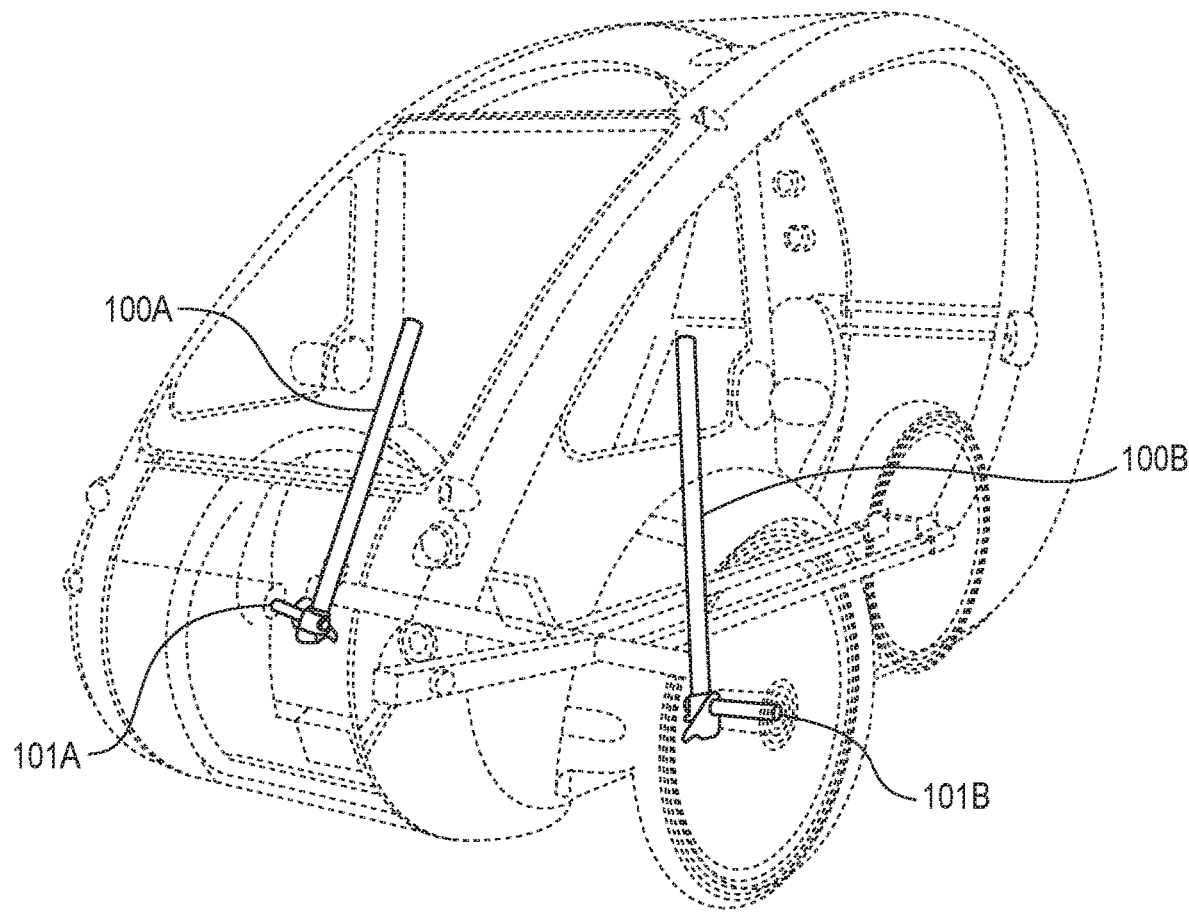
FIG. 3 is an illustration of the rods and the wheel attachments as position within a vehicle.
Figure 4:
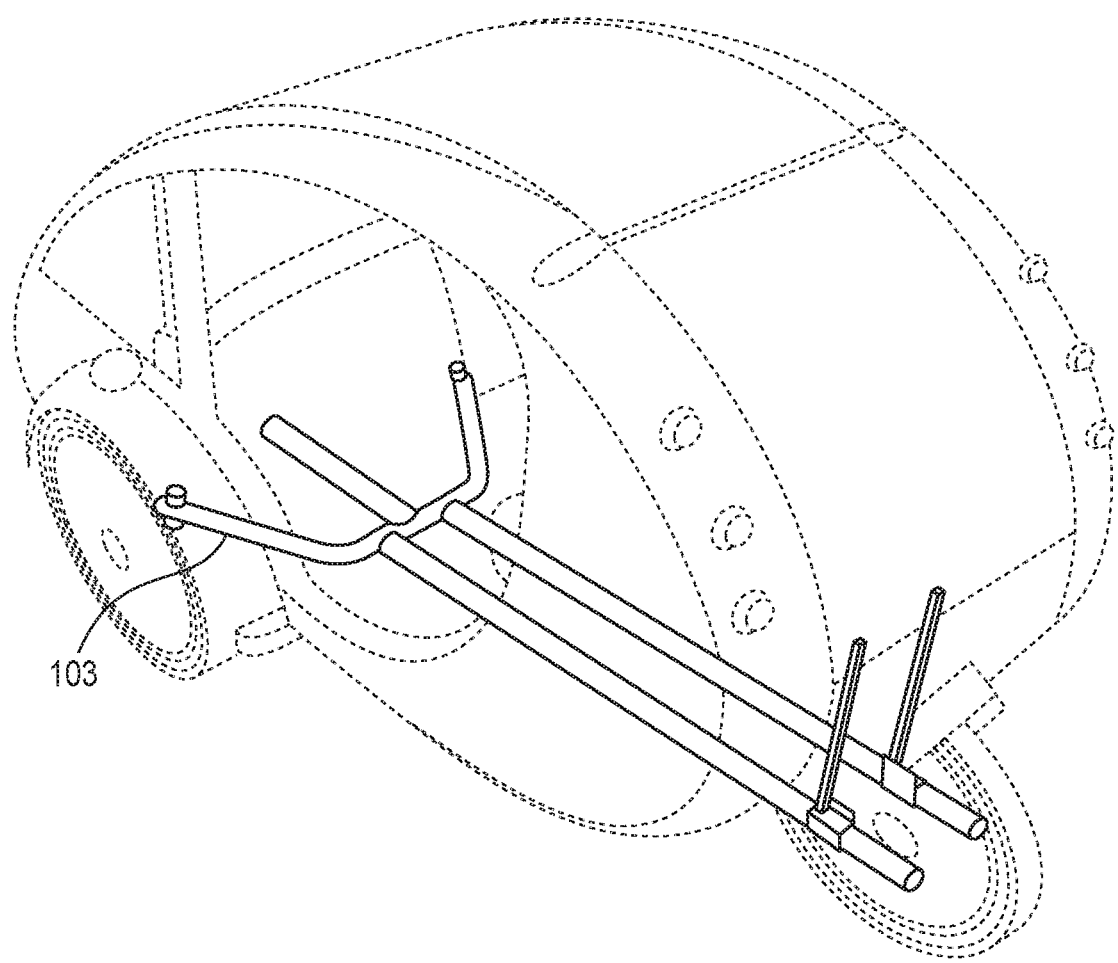
FIG. 4 is an illustration of a C shaped first cross bar attached to a vehicle frame.
Figure 5:
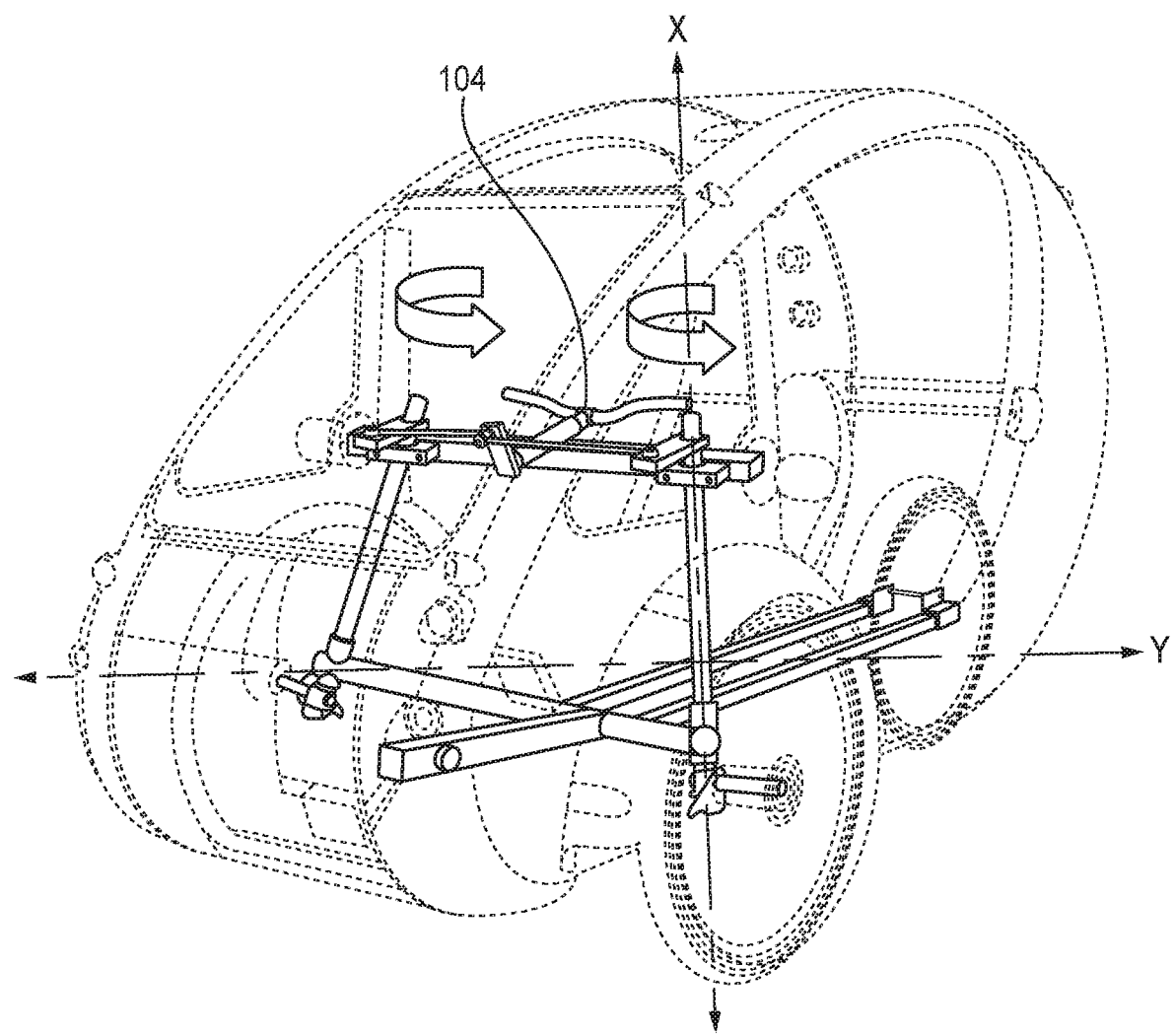
FIG. 5 is an illustration of one embodiment of the steering assembly.

As used herein the steering means 104 refers to a steering mechanism which enables the manual rotation of the rods in unison about the X axis, which in turn pivots the wheels and steers the vehicle. Such steering mean can consist of a steering device like a bike handle bars as in shown in FIGS. 1 and 5 connected through a column positioned essentially perpendicular to two bars connected to the rods in such a way that the rods are rotated in unison about their X axes.

The steering assembly can be attached to any type of self-propelled or motor propelled vehicle. Such self-propelled vehicle could be a pedal type bicycle such as a recumbent type tricycle.

It should be understood that the above description discloses specific embodiments and are for purposes of illustration only. There may be other modifications and changes obvious to those of ordinary skill in the art which fall within the scope of the present invention which should be limited only by the following claims and their legal equivalents.

What is claimed is:

1. A steering assembly for a vehicle, the steering assembly comprising:
   two rods each having distal and proximal ends, each rod substantially vertical and rotatable about a respective X axis, each rod further connected to a wheel attachment device on the distal end thereof to which a wheel can be rotatably secured;
   a first cross bar located between the distal end of each rod, which enables the steering assembly to be attached to a frame of the vehicle and allows each of the rods to rotate;
   a second cross bar connected to the proximal end of each rod in such a way as to allow each of the rods to rotate; and a steering mechanism attached to and located between the rods in a manner that enables the rods to be rotated to pivot each of the respective wheels and steers the vehicle, wherein at least one of the first and second wheel attachments are attached to the first cross bar through the rods at a position that is lower than an upper rim of each of the wheels.

2. The steering assembly of claim 1, wherein the rods are made of aluminum.

3. The steering assembly of claim 1, wherein the first cross bar has a C shape.

4. The steering assembly of claim 1, wherein the steering assembly is used for the vehicle and the vehicle further comprises a self-propellable vehicle.

5. The steering assembly of claim 1, wherein the first cross bar is essentially horizontal and attached to the rods in a manner in which enables each rod to be rotated about the X axis in unison.

6. A steering assembly for a pedal driven vehicle, the vehicle having a frame, the frame comprising at least two horizontal support beams that further comprising two essentially horizontal beams having a proximal end and distal end and at least one adjustable wheel attachment located on the distal end, the steering assembly comprising:

a first rod having a first distal end and a first proximal end, the first rod is rotatable about a first axis;

a second rod having a second distal end and a second proximal end, the second rod is rotatable about a second axis;

a first cross bar attached to both the first distal end and the second distal end, the first cross bar further attached to a frame of the vehicle;

a second cross bar attached to both the first proximal end and the second proximal end; and a steering mechanism attached to the second cross bar and configured to manually rotate the first rod about the first axis and the second rod about the second axis substantially concurrently, wherein a plane formed by the first cross bar and one of the at least one adjustable wheel attachment of the frame is substantially perpendicular to the rods.

7. The steering assembly of claim 6, further comprising a first wheel attachment coupled to the first distal end of the first rod and a second wheel attachment coupled to the second distal end of the second rod, the first wheel attachment is configured to rotatably secure a first wheel and the second wheel attachment is configured to rotatably secure a second wheel.

8. The steering assembly of claim 7, wherein when the first rod is rotate about the first axis, the first wheel is rotate accordingly, and wherein when the second rod is rotate about the second axis, the second wheel is rotate accordingly.

9. The steering assembly of claim 8, wherein the steering assembly includes a protective shell configured to substantially enclose both the steering assembly and the first and second wheels.

10. The steering assembly of claim 6, wherein the first cross bar and the second cross bar are coupled only through the first and second rods.

11. The steering assembly of claim 6, wherein the steering assembly is not foldable.

12. The steering assembly of claim 7, further comprising a third wheel positioned and attached between the two support beams.

13. A method of assembling a steering assembly for a vehicle, the steering assembly comprising a first rod, a second rod, a first cross bar, a second cross bar and a steering mechanism, the method comprising:

preparing the first rod having a first distal end and a first proximal end, the first rod substantially vertical and rotatable about a first X axis;

preparing the second rod having a second distal end and a second proximal end, the second rod substantially vertical and rotatable about a second X axis;

connecting the first rod to a first wheel attachment device on the first distal end thereof to which a first wheel can be rotatably secured;

connecting the second rod to a second wheel attachment device on the second distal end thereof to which a second wheel can be rotatably secured;

preparing the first cross bar located between the first distal end and the second distal end;

connecting the second cross bar to the first proximal end and the second proximal end in such a way as to allow each of the rods to rotate; attaching a steering mechanism to the rods in a manner that enables the rods to be rotated to pivot each of the respective wheels and steers the vehicle; and attaching the steering assembly to a frame of the vehicle and allowing each of the rods to rotate, wherein at least one of the wheel attachments are attached to the first cross bar through the rods at a position that is lower than an upper rim of each of the wheels.

14. The method of claim 13, wherein the rods are made of aluminum.

15. The method of claim 13, wherein the first cross bar has a C shape.

16. The method of claim 13, wherein the steering assembly is used for the vehicle and the vehicle further comprises a self-propellable vehicle.

17. The method of claim 13, wherein the first cross bar is essentially horizontal and attached to the rods in a manner in which enables each rod to be rotated about the first X axis and the second X axis in unison.

18. A method of steering a vehicle having a steering assembly, the steering assembly comprising a first rod having a first distal end and a first proximal end and substantially vertical and rotatable about a first axis and connected to a first wheel attachment device on the first distal end thereof to which a first wheel can be rotatably secured, a second rod having a second distal end and a second proximal end and substantially vertical and rotatable about a second axis and connected to a second wheel attachment device on the second distal end thereof to which a second wheel can be rotatably secured, a first cross bar located between the first distal end and the second distal end, a second cross bar attached to both the first proximal end and the second proximal end and a steering mechanism attaching to the rods in a manner that enables the rods to be rotated to pivot each of the respective wheels and steers the vehicle, the method comprising:

shifting the steering mechanism to a first shifting direction to cause the first rod to rotate about the first axis in a first rotating direction and the second rod to rotate about the second axis in the first rotating direction substantially concurrently; and shifting the steering mechanism to a second shifting direction to cause the first rod to rotate about the first axis in a second rotating direction and the second rod to rotate about the second axis in the second rotating direction substantially concurrently, wherein at least one of the first and second wheel attachment devices are attached to the first cross bar through the rods at a position that is lower than an upper rim of each of the wheels.

19. The method of claim 18, wherein the first shifting direction is substantially parallel to a longitudinal direction of the second cross bar.

\* \* \* \* \*